(12) United States Patent
Yin et al.

(10) Patent No.: US 11,172,154 B2
(45) Date of Patent: Nov. 9, 2021

(54) IMAGE SENSOR ARRANGED IN SPI SLAVE CIRCUIT OF A SERIAL PERIPHERAL INTERFACE AND PIXEL ARRAY CIRCUIT THEREIN

(71) Applicant: Guangzhou Tyrafos Semiconductor Technologies Co., Ltd., Guangzhou (CN)

(72) Inventors: Ping-Hung Yin, Taipei (TW); Jia-Shyang Wang, Miaoli County (TW)

(73) Assignee: Guangzhou Tyrafos Semiconductor Technologies Co., Guangzhou (CN)

( * ) Notice: Subject to any disclaimer, the term of this patent is extended or adjusted under 35 U.S.C. 154(b) by 0 days.

(21) Appl. No.: 17/065,581

(22) Filed: Oct. 8, 2020

(65) Prior Publication Data
US 2021/0136311 A1    May 6, 2021

(30) Foreign Application Priority Data
Nov. 6, 2019 (TW) .................................. 108140328

(51) Int. Cl.
| | |
|---|---|
| *H04N 5/3745* | (2011.01) |
| *H04N 5/353* | (2011.01) |
| *H04N 5/38* | (2006.01) |
| *H04N 5/369* | (2011.01) |

(52) U.S. Cl.
CPC ......... *H04N 5/37452* (2013.01); *H04N 5/353* (2013.01); *H04N 5/3698* (2013.01); *H04N 5/38* (2013.01)

(58) Field of Classification Search
CPC ...... H04N 5/37452; H04N 5/353; H04N 5/38; H04N 5/3698; H04N 5/235–243; G03B 7/00–28; G03B 9/58–62; G03B 2207/00–005
USPC .................. 348/297, 362–368; 396/213–262
See application file for complete search history.

(56) References Cited

U.S. PATENT DOCUMENTS

| | | | |
|---|---|---|---|
| 2015/0144790 A1* | 5/2015 | Velichko | G01S 17/894 250/338.4 |
| 2019/0360863 A1* | 11/2019 | Tang | G01J 1/46 |
| 2020/0280669 A1* | 9/2020 | Kawaguchi | G06T 5/009 |

* cited by examiner

*Primary Examiner* — Lin Ye
*Assistant Examiner* — Chan T Nguyen
(74) *Attorney, Agent, or Firm* — Lin & Associates Intellectual Property, Inc.

(57) ABSTRACT

An image sensor for serial peripheral interface (SPI) slave circuit and a pixel array circuit therein are provided. The pixel array includes a plurality of pixel units disposed in an image sensor with the SPI slave circuit. Each pixel unit includes a photo sensor, N storages and at least one transmission circuit, wherein N is a positive integer greater than or equal to two. At least one of the N storages is coupled to the photo sensor, which are connected with each other in serial or parallel, and configured to store charges accumulated by the photo sensor at different exposures. Each transmission circuit is coupled to a corresponding storage, and is controlled by a corresponding transmission control signal to transmit the stored charge of the corresponding storage during a certain time period.

14 Claims, 5 Drawing Sheets

IMAGE SENSOR ARRANGED IN SPI SLAVE CIRCUIT OF A SERIAL PERIPHERAL INTERFACE AND PIXEL ARRAY CIRCUIT THEREIN

CROSS-REFERENCE TO RELATED APPLICATION

This application claims the priority of Taiwanese patent application No. 108140328, filed on Nov. 6, 2019, which is incorporated herewith by reference.

BACKGROUND OF THE INVENTION

1. Field of the Invention

The present invention relates to an image sensor, and in particular to an image sensor arranged in a SPI slave circuit of the serial peripheral interface circuit and a pixel array circuit therein.

2. The Prior Arts

In an electronic system where the image sensor is used as a serial peripheral interface (SPI) slave circuit, the image sensor includes a storage circuit for storing the pixel value obtained from the exposure process performed by the image sensor. In addition, the storage circuit will provide the pixel values required by the master circuit of the serial peripheral interface for subsequent image processing. Therefore, the storage circuit can also be used as a buffer between the image sensor and the master circuit.

The above-mentioned storage circuit is generally arranged in a pixel array independent of the image sensor, and the storage circuit usually requires a larger memory. Therefore, the storage circuit occupies a larger circuit area, which makes the hardware cost of the image sensor increase.

SUMMARY OF THE INVENTION

In order to solve the above-mentioned problem of increased cost, the present invention provides an image sensor used in a SPI slave circuit of a serial peripheral interface and a pixel array circuit thereof, which can effectively reduce the circuit area of the image sensor, and thereby reduce the cost of the image sensor.

The image sensor of the present invention includes a pixel circuit including a plurality of pixel units. Each of the pixel units includes a photo sensor, N storages and at least one transmission circuit, wherein N is a positive integer greater than or equal to two. A photo sensor is coupled to a first node. At least one of the N storages is coupled to a first node, and the N storages are connected with each other in serial or parallel, and configured to store charges accumulated by the photo sensor at different exposures. Each of the at least one transmission circuit is coupled to one of the N storages, and is controlled by one corresponding transmission control signal to transmit the stored charge of the corresponding storage during a certain time period.

In an embodiment of the present invention, each of the N storages is an analog memory cell.

In an embodiment of the present invention, each of the N storages includes a storage switch and a charge storage element, and has a corresponding transmission circuit. The storage switch has a first end coupled to the first node. The storage switch has a control end receiving one of N storage control signals. The storage switch has a second end coupled to its corresponding transmission circuit. The charge storage element is coupled to the second end of the storage switch for storing the charge from the photo sensor.

In an embodiment of the present invention, each of the at least one transmission circuit includes a transmission switch and a reset switch. The transmission switch is coupled to one of the N storages. The transmission switch has a control end receiving the transmission control signal corresponding to the transmission switch. The reset switch is coupled to a reset power supply. The reset switch has a control end receiving a reset control signal.

In an embodiment of the present invention, each of the at least one transmission circuit includes a transmission switch. The transmission switch is coupled to one of the N storages. The transmission switch has a control end receiving the transmission control signal corresponding to the transmission switch. Each of the pixel units further includes a reset switch. The reset switch is coupled to a reset power supply. The reset switch has a control end receiving a reset control signal.

In an embodiment of the present invention, when the pixel array circuit performs an exposure operation, the photo sensor of each of the pixel units is simultaneously exposed.

The pixel array circuit of the present invention includes a plurality of pixel units. Each of the pixel units includes a photo sensor, N storages and at least one transmission circuit, wherein N is a positive integer greater than or equal to two. A photo sensor is coupled to a first node. At least one of the N storages is coupled to a first node, and the N storages are connected with each other in serial or parallel, and configured to store charge accumulated by the photo sensor at different exposures. Each of the at least one transmission circuit is coupled to one of the N storages, and is controlled by one corresponding transmission control signal to transmit the stored charge of the corresponding storage during a certain time period.

Based on the above, the image sensor and the pixel array circuit thereof proposed by the embodiments of the present invention are provided with a memory in each pixel unit to store the charges accumulated by the photo sensor after exposure. Since the circuit area of the storage charge storage is smaller than that of the digital memory used to store the digital pixel value, the hardware cost of the image sensor can be effectively reduced.

Those with ordinary knowledge in the technical field will understand that the effects that can be achieved through the disclosure of the present invention are not limited to the content described above, and the advantages of the present invention will be more clearly understood from the above detailed description with reference to the accompanying drawings.

DETAILED DESCRIPTION OF THE PREFERRED EMBODIMENT

Figure 1:
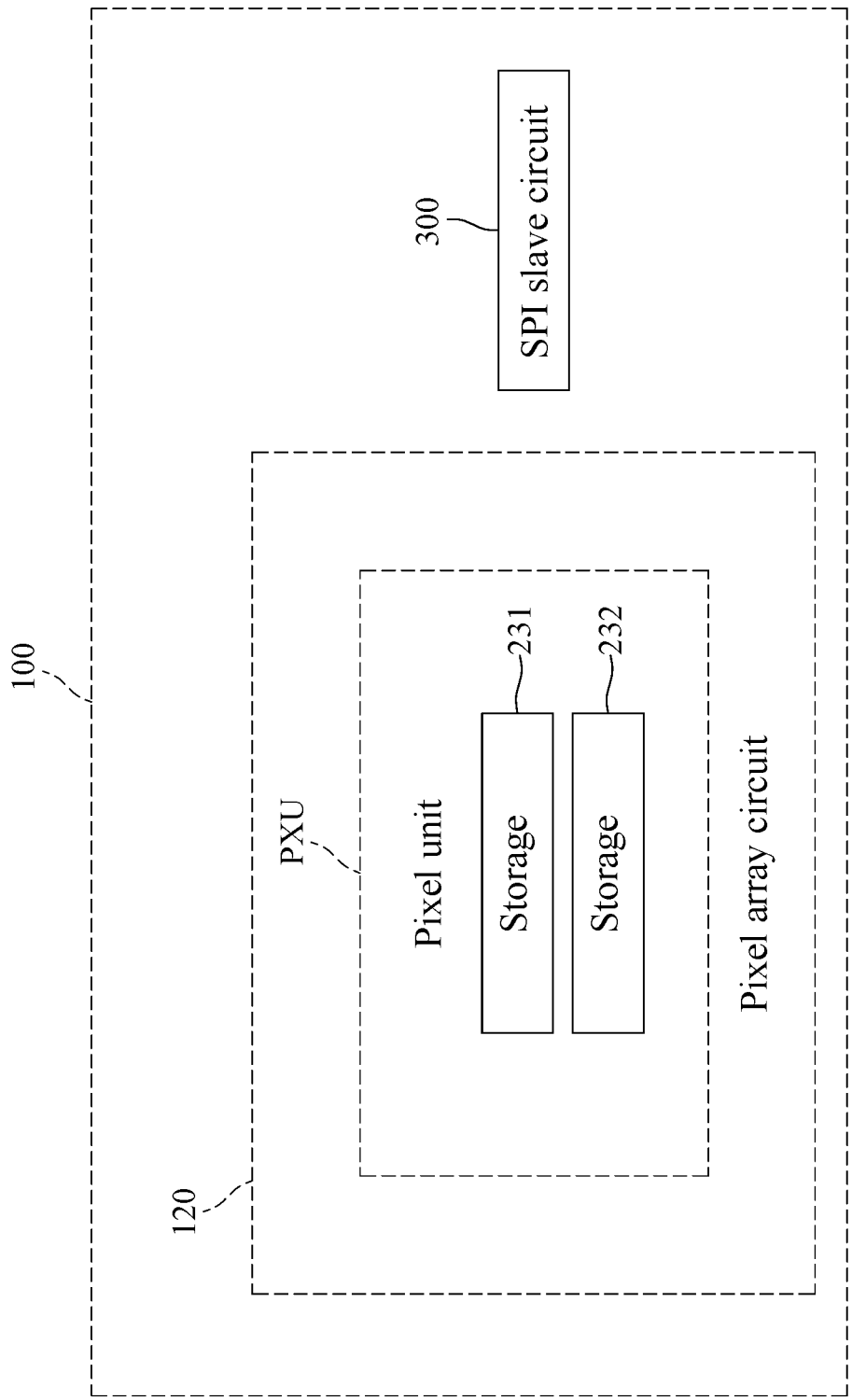
FIG. 1 illustrates a diagram of a configuration of a pixel unit according to an embodiment of the present invention.
Figure 2:
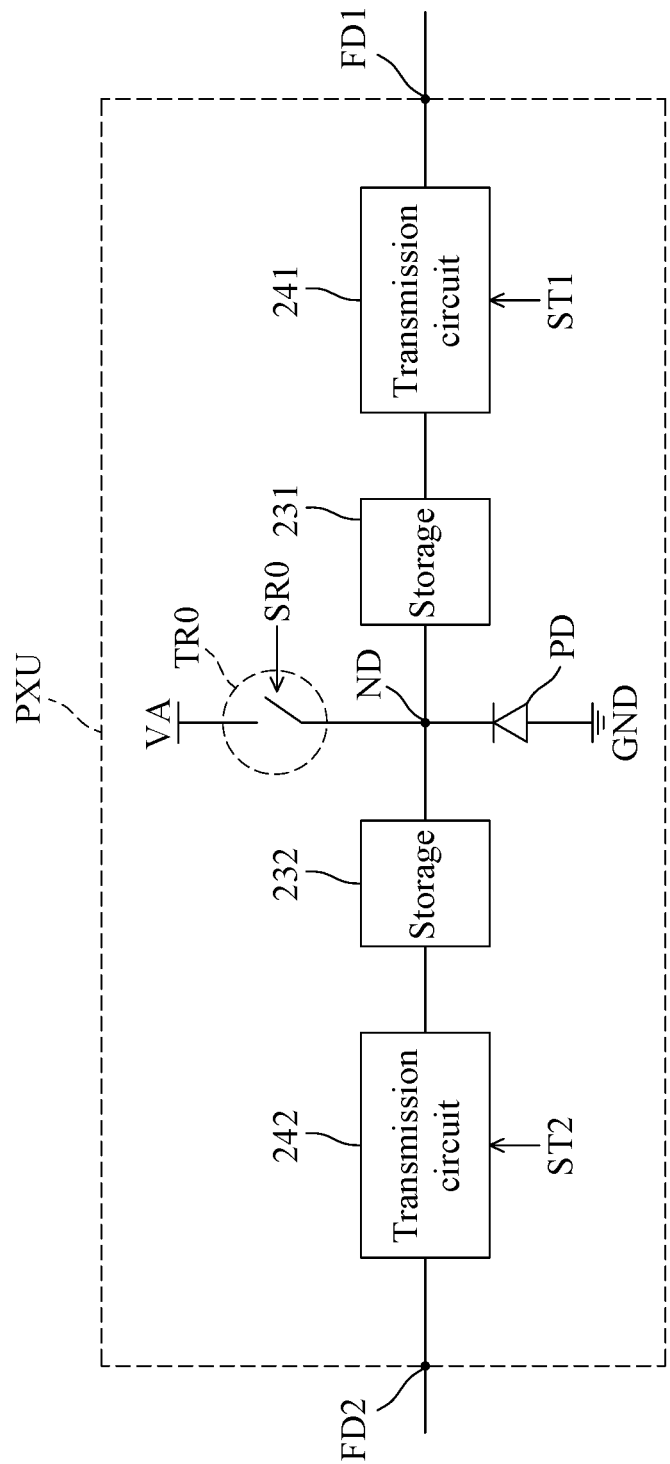
FIG. 2 illustrates a circuitry block diagram of a pixel unit according to an embodiment of the invention.

FIG. 1 illustrates a diagram of a configuration of a pixel unit according to an embodiment of the present invention. The pixel array circuit 120 and the SPI slave circuit 300 are disposed in the image sensor 100 which includes a plurality of pixel units. Each pixel unit PXU includes storages 231 and 232 that can be used as buffers. More detailed description is in the following. Please refer to FIG. 2, FIG. 2 illustrates a circuitry block diagram of a pixel unit according to an embodiment of the invention. The image sensor 100 may include a pixel array circuit 120. The pixel array circuit 120 may include a plurality of pixel units PXU arranged in an array. Each pixel unit PXU may include a photo sensor PD, N storages, at least one transmission circuit. Each pixel unit PXU includes N transmission circuits and M floating diffusion nodes herein, where N is a positive integer greater than or equal to two, and M is a positive integer less than or equal to N. However, for the convenience of description and the brevity of the drawings, an exemplary embodiment with N being two will be used for description below. As for the embodiment where N is greater than two, it can be inferred based on the following description. In addition, FIG. 2 is described in an exemplary embodiment where M is two, and the embodiment where M is one will be described in detail later.

As shown in FIG. 2, each pixel unit PXU includes a photo sensor PD, two storages 231, 232, two transmission circuits 241, 242, and two floating diffusion nodes FD1, FD2. The anode of the photo sensor PD is coupled to the ground end GND. The cathode of the photo sensor PD is coupled to the first node ND. In particular, when the pixel array circuit 120 performs an exposure operation, the photo sensors PD of all the pixel units PXU are simultaneously exposed, so as to implement a global shutter exposure operation.

The storages 231 and 232 are coupled to the first node ND. The storages 231 and 232 can respectively store the charges accumulated by the photo sensor PD in different exposures. For example, the storage 231 can store the charges accumulated by the photo sensor PD in the Lth exposure, and the storage 232 can store the charges accumulated by the photo sensor PD in the (L+1)th exposure, where L is a positive integer. It can be understood that the charges stored in the storage 231 of all the pixel units PXU of the pixel array circuit 120 correspond to an image, and the charges stored in the storage 232 of all the pixel units PXU of the pixel array circuit 120 correspond to another image. In other words, the circuit of each pixel unit PXU is designed to have two storages 231 and 232 so that the pixel array circuit 120 can have a memory capable of storing two images.

The transmission circuit 241 is coupled between the storage 231 and the floating diffusion node FD1, and is controlled by the transmission control signal ST1 to transfer the charges stored in the storage 231 to the floating diffusion node FD1 within a specific period of time. Similarly, the transmission circuit 242 is coupled between the storage 232 and the floating diffusion node FD2, and is controlled by the transmission control signal ST2 to transfer the charges stored in the storage 232 to the floating diffusion node FD2 in another specific time period.

It should be noted that, since the storages 231 and 232 are used to store charges, the storages 231 and 232 have a smaller circuit area than the digital memory circuit generally used to store digital pixel values. Therefore, the hardware cost of the image sensor 100 can be effectively reduced.

In an embodiment of the present invention, the storage 231, 232 may be implemented by various types of analog memory cells.

In an embodiment of the present invention, each pixel unit PXU may further include a reset switch TR0. The first end of the reset switch TR0 is coupled to the reset power VA. The second end of the reset switch TR0 is coupled to the first node ND. The control end of the reset switch TR0 receives the reset control signal SR0. The reset control signal SR0 can control the reset switch TR0 to be turned on/off, thereby controlling the reset of the photo sensor PD. In an embodiment of the present invention, the reset switch TR0 can be implemented with a metal-oxide-semiconductor field-effect transistor (MOSFET), but it is not limited thereto.

In an embodiment of the present invention, each pixel unit PXU may further include other circuits for cooperatively performing readout operations, such as two source follower transistors, which are respectively coupled to the floating diffusion nodes FD1 and FD2 to convert the charges of the floating diffusion nodes FD1 and FD2 into corresponding voltages.

Figure 3:
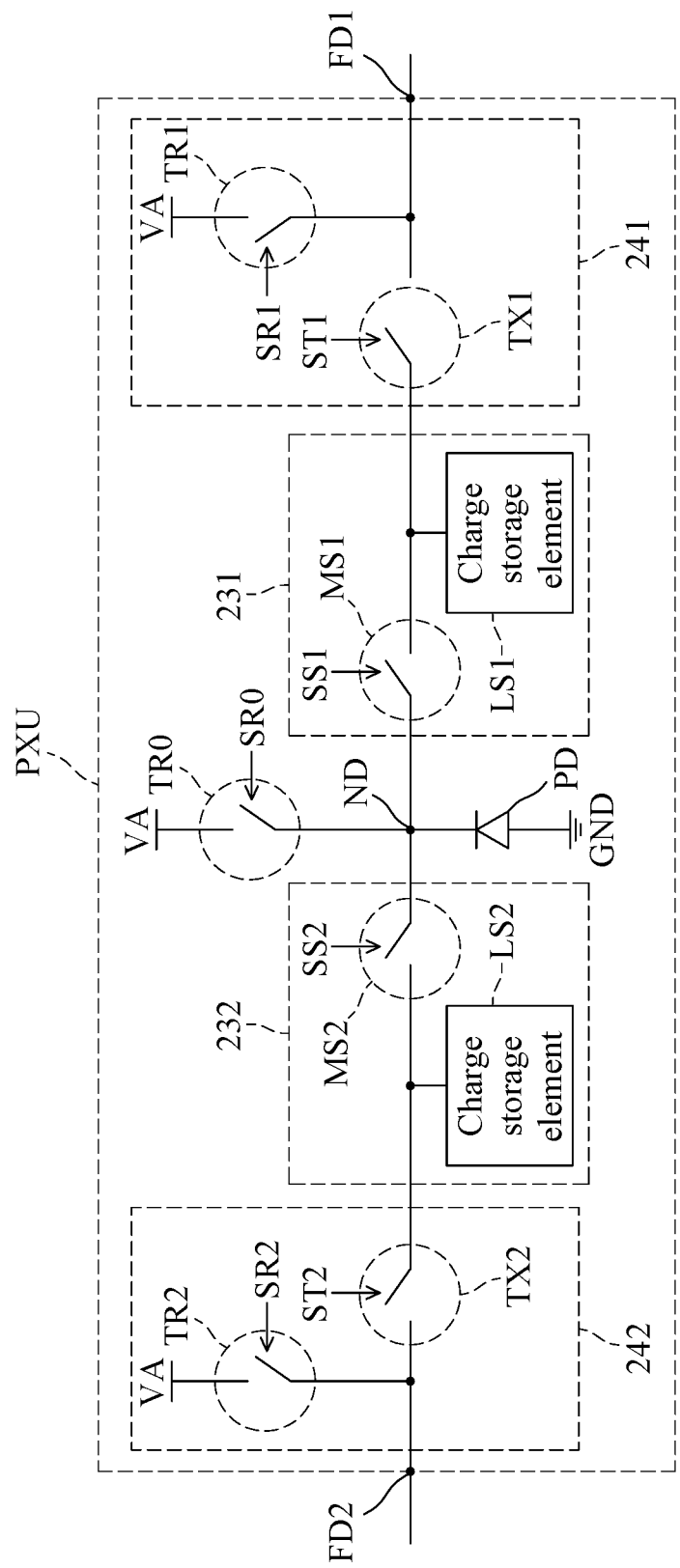
FIG. 3 illustrates a diagram of a circuitry structure of a pixel unit of FIG. 2 according to an embodiment of the invention.

FIG. 3 illustrates a diagram of a circuitry structure of a pixel unit of FIG. 2 according to an embodiment of the invention. Please refer to FIG. 3, the storage 231 may include a storage switch MS1 and a charge storage element LS1. The first end of the storage switch MS1 is coupled to the first node ND. The control end of the storage switch MS1 receives the storage control signal SS1. The second end of the storage switch MS1 is coupled to the charge storage element LS1 and is coupled to the transmission circuit 241. When the storage switch MS1 is turned on, the charge storage element LS1 can store the charges from the photo sensor PD.

Similarly, the storage 232 may include a storage switch MS2 and a charge storage element LS2. The first end of the storage switch MS2 is coupled to the first node ND. The control end of the storage switch MS2 receives the storage control signal SS2. The second end of the storage switch MS2 is coupled to the charge storage element LS2 and is coupled to the transmission circuit 242. When the storage switch MS2 is turned on, the charge storage element LS2 can store the charges from the photo sensor PD.

The transmission circuit 241 may include a transmission switch TX1 and a reset switch TR1. The first end of the transmission switch TX1 is coupled to the storage 231. The second end of the transmission switch TX1 is coupled to the floating diffusion node FD1. The control end of the transmission switch TX1 receives the transmission control signal ST1. The first end of the reset switch TR1 is coupled to the reset power VA. The second end of the reset switch TR1 is coupled to the floating diffusion node FD1. The control end of the reset switch TR1 receives the reset control signal SR1.

Similarly, the transmission circuit 242 may include a transmission switch TX2 and a reset switch TR2. The first end of the transmission switch TX2 is coupled to the storage 232. The second end of the transmission switch TX2 is coupled to the floating diffusion node FD2. The control end of the transmission switch TX2 receives the transmission control signal ST2. The first end of the reset switch TR2 is coupled to the reset power VA. The second end of the reset switch TR2 is coupled to the floating diffusion node FD2. The control end of the reset switch TR2 receives the reset control signal SR2.

In an embodiment of the present invention, the charge storage elements LS1 and LS2 can be implemented by capacitors or diodes, but the present invention is not limited to this.

In an embodiment of the present invention, the storage switches MS1, MS2, the reset switches TR1, TR2, and the transmission switches TX1, TX2 can be implemented with MOSFET, but it is not limited thereto.

Please refer to FIG. 3. As shown in FIG. 3, the first exposure and storage operation can be performed through the photo sensor PD and the storage 231. First, the reset control signal SR0 and the storage control signal SS1 can be driven to the first level (for example, a logic high level) to turn on the reset switches TR0 and the storage switches MS1 of all pixel units PXU, thereby resetting the photo sensors PD and the charge storage elements LS1 of all the pixel units PXU. Then, the reset control signal SR0 and the storage control signal SS1 can be driven to a second level (for example, a logic low level) to turn off the reset switches TR0 and the storage switches MS1 of all the pixel units PXU, and to make the photo sensors PD of all the pixel units PXU simultaneously exposed to light for a period of exposure time to be integrated. After the photo sensors PD of all the pixel units PXU are exposed, the storage control signal SS1 can be driven to the first level to turn on the storage switch MS1, so as to transmit the charges of the photo sensor PD to the charge storage element LS1. Then, the storage control signal SS1 can be driven to the second level to turn off the storage switch MS1 to complete the storage operation corresponding to the first exposure.

After the first exposure and storage operation is completed, the readout operation corresponding to the first exposure and storage operation can be performed through the transmission circuit 241. First, the reset control signal SR1 can be driven to the first level to turn on the reset switch TR1 to reset the floating diffusion node FD1, so that the voltage of the floating diffusion node FD1 is the voltage of the reset power VA. Then, the reset control signal SR1 can be driven to the second level to turn off the reset switch TR1. Afterwards, in a specific period of time, the transmission control signal ST1 is driven to the first level to turn on the transmission switch TX1, thereby to transmit the charges stored in the charge storage element LS1 to the floating diffusion node FD1. In this way, the pixel value corresponding to the first image can be obtained according to the voltage of the floating diffusion node FD1 of each pixel unit PXU.

In addition, the second exposure and storage operation can be performed through the photo sensor PD and the storage 232. First, the reset control signal SR0 and the storage control signal SS2 can be driven to the first level to turn on the reset switches TR0 and the storage switches MS2 of all the pixel units PXU, thereby to reset the photo sensors PD of all the pixel units PXU and the charge storage element LS2. Then, the reset control signal SR0 and the storage control signal SS2 can be driven to the second level to turn off the reset switches TR0 and the storage switches MS2 of all the pixel units PXU, and to make the photo sensors PD of all the pixel units PXU simultaneously exposed to light for an exposure time to be integrated. After the photo sensors PD of all the pixel units PXU are exposed, the storage control signal SS2 can be driven to the first level to turn on the storage switch MS2, thereby to transmit the charges of the photo sensor PD to the charge storage element LS2. Then, the storage control signal SS2 can be driven to the second level to turn off the storage switch MS2 to complete the storage operation corresponding to the second exposure.

After the second exposure and storage operation is completed, a readout operation corresponding to the second exposure and storage operation can be performed through the transmission circuit 242. First, the reset control signal SR2 can be driven to the first level to turn on the reset switch TR2, thereby to reset the floating diffusion node FD2, so that the voltage of the floating diffusion node FD2 is the voltage of the reset power supply VA. Then, the reset control signal SR2 can be driven to the second level to turn off the reset switch TR2. Afterwards, in a specific period of time, the transmission control signal ST2 is driven to the first level to turn on the transmission switch TX2, thereby to transmit the charges stored in the charge storage element LS2 to the floating diffusion node FD2. In this way, the pixel value corresponding to the second image can be obtained according to the voltage of the floating diffusion node FD2 of each pixel unit PXU.

In an embodiment of the present invention, in order to speed up the operation speed and efficiency of the image sensor 100, the operation of the photo sensor PD and the storage 232 and the operation of the transmission circuit 241 may be pipelined, and the operation of the photo sensor PD and the storage 231 and the operation of the transmission circuit 242 are pipelined. In detail, when the transmission circuit 241 performs the readout operation corresponding to the Kth exposure and storage operation, the photo sensor PD and the storage 232 can perform the (K+1)th exposure and storage operation, where K is positive integer. When the transmission circuit 242 performs a readout operation corresponding to the (K+1)th exposure and storage operation, the photo sensor PD and the storage 231 can perform the (K+2)th exposure and storage operation.

For example, when the transmission circuit 241 performs the readout operation corresponding to the first exposure and storage operation, the photo sensor PD and the storage 232 can perform the second exposure and storage operation. When the transmission circuit 242 performs the readout operation corresponding to the second exposure and storage operation, the photo sensor PD and the storage 231 can perform the third exposure and storage operation.

Figure 4:
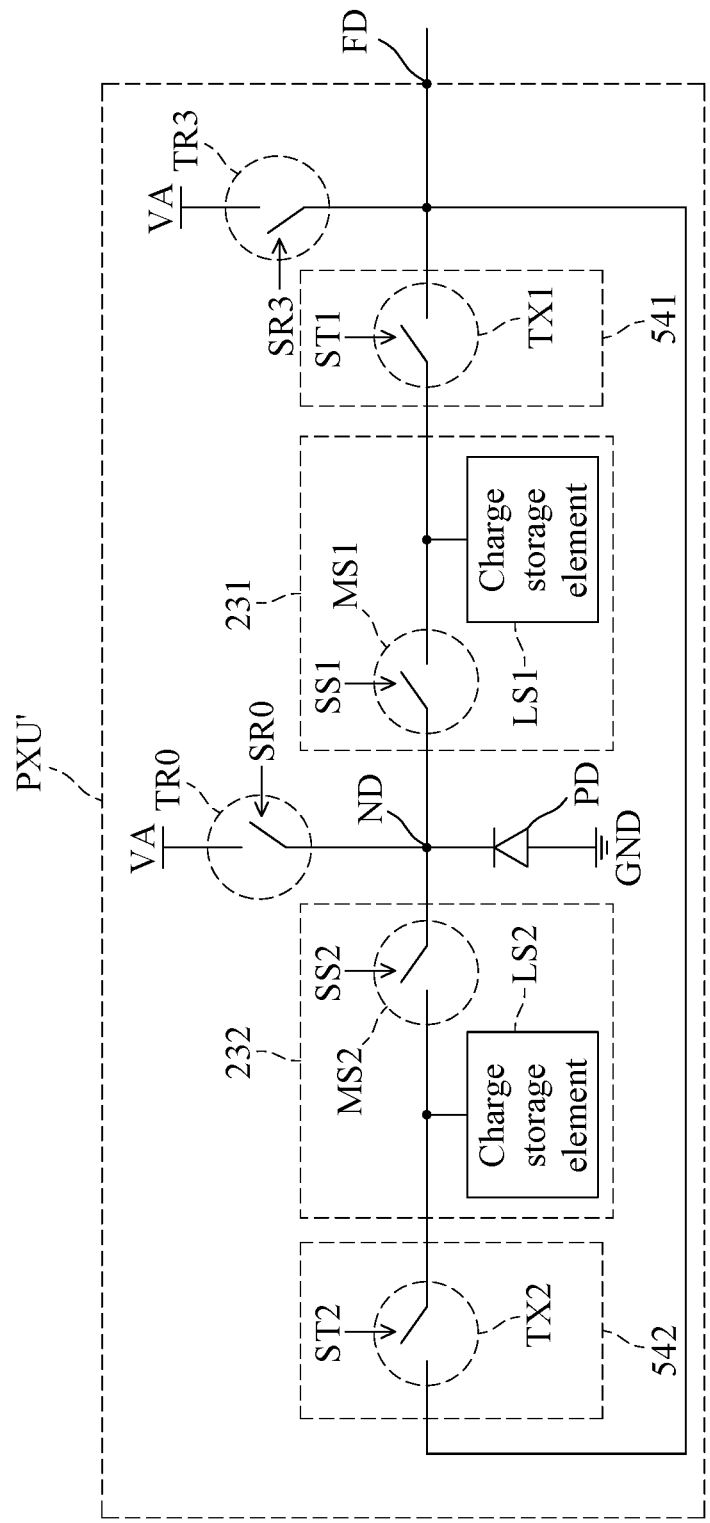
FIG. 4 illustrates a diagram of a circuitry structure of a pixel unit according to another embodiment of the invention.
Figure 5:
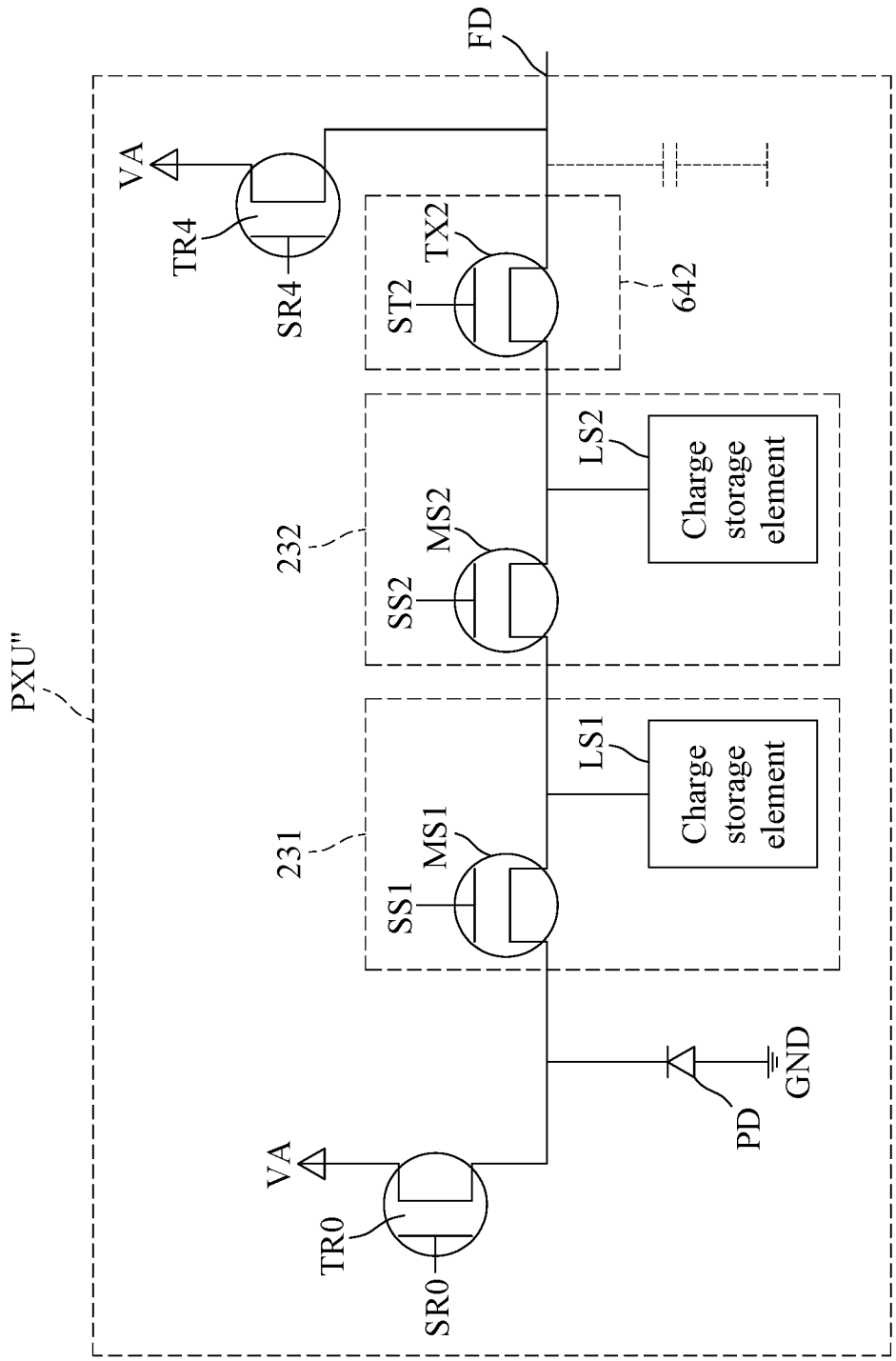
FIG. 5 illustrates a diagram of a circuitry structure of a pixel unit according to another embodiment of the invention.

FIG. 4 illustrates a diagram of a circuitry structure of a pixel unit according to another embodiment of the invention. Please refer to FIG. 4, each pixel unit PXU' includes the reset switches TR0, TR3, the photo sensor PD, two storages 231, 232, two transmission circuits 541, 542, and a floating diffusion node FD. The implementations of the reset switch TR0, the photo sensor PD, and the storages 231, 232 of FIG. 5 are similar to the reset switch TR0, the photo sensor PD, and the storages 231, 232 of FIG. 2 (or FIG. 3), respectively, so the related description of the above-mentioned FIGS. 2 to 3 can be referred and will not be repeated here.

The transmission circuit 541 is coupled between the storage 231 and the floating diffusion node FD, and is controlled by the transmission control signal ST1 to transmit the charges stored in the storage 231 to the floating diffusion node FD in a specific period of time. Similarly, the transmission circuit 542 is coupled between the storage 232 and the floating diffusion node FD, and is controlled by the transmission control signal ST2 to transfer the charges stored in the storage 232 to the floating diffusion node FD in another specific time period.

The transmission circuit 541 may include a transmission switch TX1. The first end of the transmission switch TX1 is coupled to the storage 231. The second end of the transmission switch TX1 is coupled to the floating diffusion node FD. The control end of the transmission switch TX1 receives the transmission control signal ST1. Similarly, the transmission circuit 542 may include a transmission switch TX2. The first end of the transmission switch TX2 is coupled to the storage 232. The second end of the transmission switch TX2 is coupled to the floating diffusion node FD. The control end of the transmission switch TX2 receives the transmission control signal ST2.

The first end of the reset switch TR0 is coupled to the reset power VA. The second end of the reset switch TR3 is coupled to the floating diffusion node FD. The control end of the reset switch TR0 receives the reset control signal SR0. The reset control signal SR3 can control the reset switch TR3 to be turned on/off, thereby control the reset of the floating diffusion node FD. In an embodiment of the present invention, the reset switch TR3 can be implemented with MOSFET, but it is not limited thereto.

Please refer to FIG. 4. As shown in FIG. 4, the first exposure and storage operation can be performed through the photo sensor PD and the storage 231. First, the reset control signal SR0 and the storage control signal SS1 can be driven to the first level (for example, a logic high level) to turn on the reset switches TR0 and the storage switches MS1 of all pixel units PXU', thereby to reset the photo sensors PD and the charge storage elements LS1 of all the pixel units PXU'. Then, the reset control signal SR0 and the storage control signal SS1 can be driven to a second level (for example, a logic low level) to turn off the reset switches TR0 and the storage switches MS1 of all the pixel units PXU', and to make the photo sensors PD of all the pixel units PXU' simultaneously exposed to light for a period of exposure time to be integrated. After the photo sensors PD of all the pixel units PXU' are exposed, the storage control signal SS1 can be driven to the first level to turn on the storage switch MS1, thereby to transmit the charges of the photo sensor PD to the charge storage element LS1. Then, the storage control signal SS1 can be driven to the second level to turn off the storage switch MS1 to complete the storage operation corresponding to the first exposure.

After the first exposure and storage operation is completed, the readout operation corresponding to the first exposure and storage operation can be performed through the transmission circuit 541 and the reset switch TR3. First, the reset control signal SR3 can be driven to the first level to turn on the reset switch TR3 to reset the floating diffusion node FD, so that the voltage of the floating diffusion node FD is the voltage of the reset power VA. Then, the reset control signal SR3 can be driven to the second level to turn off the reset switch TR3. Afterwards, in a specific period of time, the transmission control signal ST1 is driven to the first level to turn on the transmission switch TX1, thereby to transmit the charges stored in the charge storage element LS1 to the floating diffusion node FD. In this way, the pixel value corresponding to the first image can be obtained according to the voltage of the floating diffusion node FD of each pixel unit PXU'.

In addition, the second exposure and storage operation can be performed through the photo sensor PD and the storage 232. First, the reset control signal SR0 and the storage control signal SS2 can be driven to the first level to turn on the reset switches TR0 and the storage switches MS2 of all the pixel units PXU', thereby to reset the photo sensors PD of all the pixel units PXU' and the charge storage element LS2. Then, the reset control signal SR0 and the storage control signal SS2 can be driven to the second level to turn off the reset switches TR0 and the storage switches MS2 of all the pixel units PXU', and to make the photo sensors PD of all the pixel units PXU' simultaneously exposed to light for an exposure time to be integrated. After the photo sensors PD of all the pixel units PXU' are exposed, the storage control signal SS2 can be driven to the first level to turn on the storage switch MS2, thereby to transmit the charges of the photo sensor PD to the charge storage element LS2. Then, the storage control signal SS2 can be driven to the second level to turn off the storage switch MS2 to complete the storage operation corresponding to the second exposure.

After the second exposure and storage operation is completed, the readout operation corresponding to the second exposure and storage operation can be performed through the transmission circuit 542, the reset switch TR3 and the readout circuit 140. First, the reset control signal SR3 can be driven to the first level to turn on the reset switch TR3 to reset the floating diffusion node FD, so that the voltage of the floating diffusion node FD is the voltage of the reset power VA. Then, the reset control signal SR3 can be driven to the second level to turn off the reset switch TR3. Afterwards, in a specific period of time, the transmission control signal ST2 is driven to the first level to turn on the transmission switch TX2, thereby to transmit the charges stored in the charge storage element LS2 to the floating diffusion node FD. In this way, the pixel value corresponding to the second image can be obtained according to the voltage of the floating diffusion node FD of each pixel unit PXU'.

It can be understood that since the storage 231 and the storage 232 share the same floating diffusion node FD, the floating diffusion node FD of each pixel unit PXU' only needs to be provided with a reset switch TR3. In this way, the circuit area of each pixel unit PXU' can be reduced.

In an embodiment of the present invention, in order to speed up the operation speed and efficiency of the image sensor 100, the operation of the photo sensor PD and the storage 232 and the operation of the transmission circuit 541, and the reset switch TR3 may be pipelined, and the operation of the photo sensor PD and the storage 231 and the operation of the transmission circuit 542, and the reset switch TR3 are pipelined. In detail, when the transmission circuit 541, and the reset switch TR3 perform the readout operation corresponding to the Kth exposure and storage operation, the photo sensor PD and the storage 232 can perform the (K+1)th exposure and storage operation, where K is positive integer. When the transmission circuit 542, and the reset switch TR3 perform a readout operation corresponding to the (K+1)th exposure and storage operation, the photo sensor PD and the storage 231 can perform the (K+2)th exposure and storage operation.

For example, when the transmission circuit 541 and the reset switch TR3 perform the readout operation corresponding to the first exposure and storage operation, the photo sensor PD and the storage 232 can perform the second exposure and storage operation. When the transmission circuit 542 and the reset switch TR3 perform the readout operation corresponding to the second exposure and storage operation, the photo sensor PD and the storage 231 can perform the third exposure and storage operation.

FIG. 5 illustrates a diagram of a circuitry structure of a pixel unit according to another embodiment of the invention. Please refer to FIG. 5, which is different from FIG. 3 and FIG. 4 where the two storages 231 and 232 are coupled to the first node ND in parallel with the photo sensor PD, the two storages 231 and 232 in FIG. 5 are connected in series, and only the storage 231 and the photo sensor PD are coupled to the first node ND, each pixel unit PXU" includes the reset switches TR0, TR4, the photo sensor PD, two storages 231, 232, a transmission circuits 642 and a floating diffusion node FD. The implementations of the reset switch TR0, the photo sensor PD, and the storages 231, 232 of FIG. 5 are similar to the reset switch TR0, the photo sensor PD, and the storages 231, 232 of FIGS. 2-4, respectively, so the related description of the above-mentioned FIGS. 2 to 4 can be referred and will not be repeated here.

The transmission circuit 642 is coupled between the storage 232 and the floating diffusion node FD, and is controlled by the transmission control signal ST2 to transmit the charges stored in the storage 232 to the floating diffusion node FD in a specific period of time.

The transmission circuit 642 may include a transmission switch TX2. The first end of the transmission switch TX2 is coupled to the storage 232. The second end of the transmission switch TX2 is coupled to the floating diffusion node FD1. The control end of the transmission switch TX2 receives the transmission control signal ST2.

The first end of the reset switch TR0 is coupled to the reset power VA. The second end of the reset switch TR3 is coupled to the floating diffusion node FD. The control end of the reset switch TR0 receives the reset control signal SR0. The reset control signal SR3 can control the reset switch TR3 to be turned on/off, thereby control the reset of the floating diffusion node FD. In an embodiment of the present invention, the reset switch TR3 can be implemented with MOSFET, but it is not limited thereto.

As mentioned above, the image sensor and the pixel array circuit thereof proposed by the embodiments of the present invention are provided with a memory in each pixel unit to store the charges accumulated by the photo sensor after exposure. Since the circuit area of the storage charge storage is smaller than that of the digital memory used to store the digital pixel value, the hardware cost of the image sensor can be effectively reduced. In addition, a plurality of storages are arranged in each pixel unit to respectively store the charges accumulated by the photo sensor during different periods of exposure, and the exposure operation of global shutter type is adopted to allow the pixel array circuit to have the memory capable of storing multiple images.

It is obvious to those with ordinary knowledge in the technical field that the present invention can be implemented in other specific forms without departing from the spirit of the present invention. Therefore, the above description should not be interpreted as limitation in all respects, but as illustrative. The scope of the present invention should be determined through a reasonable interpretation of the scope of the attached claims, and all variations within the scope of the equivalent of the present invention are included in the scope of the present invention.

What is claimed is:

1. A pixel array circuit used for serial peripheral interface (SPI) slave circuit comprising:
   a plurality of pixel units disposed in an image sensor with the SPI slave circuit, each pixel unit including:
   a photo sensor coupled to a first node;
   N storages, at least one of the N storages coupled to the photo sensor, the N storages being connected with each other in serial or parallel, and configured to store charges accumulated by the photo sensor at different exposures, wherein each of the N storages includes a storage switch controlled by a corresponding storage control signal, N is a positive integer greater than or equal to two and the N storages includes at least a first storage and a second storage; and
   at least one transmission circuit coupled to a corresponding storage, and controlled by one corresponding transmission control signal to transmit the stored charges of the corresponding storage during a certain time period;
   wherein in a first exposure the first storage is turned on by the storage control signal of the first storage to store charges accumulated by the photo sensor while the second storage is turned off by the storage control signal of the second storage, and in a second exposure the second storage is turned on by the storage control signal of the second storage to store charges accumulated by the photo sensor while the first storage is turned off by the storage control signal of the first storage.

2. The pixel array circuit of claim 1, wherein each of the N storages is an analog memory cell.

3. The pixel array circuit of claim 1, wherein the storage switch of each of the N storages has a first end coupled to the first node, a control end receiving the corresponding storage control signal and a second end coupled to a corresponding transmission circuit, and each of the N storages further includes a charge storage element coupled to the second end of the storage switch for storing the charge from the photo sensor.

4. The pixel array circuit of claim 1, wherein each of the at least one transmission circuit includes:
   a transmission switch coupled to one of the N storages, and having a control end receiving the transmission control signal corresponding to the transmission switch; and
   a reset switch coupled to a reset power supply, and having a control end receiving a reset control signal.

5. The pixel array circuit of claim 1, wherein each of the at least one transmission circuit includes:
   a transmission switch coupled to one of the N storages, and having a control end receiving the transmission control signal corresponding to the transmission switch;
   wherein each of the pixel units further includes:
   a reset switch coupled to a reset power supply, and having a control end receiving a reset control signal.

6. The pixel array circuit of claim 1, wherein each of the pixel units further includes:
   a reset switch coupled to a reset power supply, and having a control end receiving a reset control signal.

7. The pixel array circuit of claim 1, wherein when the pixel array circuit performs an exposure operation, the photo sensor of each of the pixel units is simultaneously exposed.

8. An image sensor arranged in a SPI slave circuit of a serial peripheral interface, the image sensor includes a pixel array circuit comprising:
   a plurality of pixel units disposed in the image sensor with the SPI slave circuit, each pixel unit including:
   a photo sensor coupled to a first node;
   N storages, at least one of the N storages coupled to the first node, the N storages being connected with each other in serial or parallel, and configured to store charges accumulated by the photo sensor at different exposures, wherein each of the N storages includes a storage switch controlled by a corresponding storage control signal, N is a positive integer greater than or equal to two and the N storages includes at least a first storage and a second storage; and
   at least one transmission circuit coupled to a corresponding storage, and controlled by one corresponding transmission control signal to transmit the stored charges of the corresponding storage during a certain time period;
   wherein in a first exposure the first storage is turned on by the storage control signal of the first storage to store charges accumulated by the photo sensor while the second storage is turned off by the storage control signal of the second storage, and in a second exposure the second storage is turned on by the storage control signal of the second storage to store charges accumulated by the photo sensor while the first storage is turned off by the storage control signal of the first storage.

9. The image sensor of claim 8, wherein each of the N storages is an analog memory cell.

10. The image sensor of claim 8, wherein the storage switch of each of the N storages has a first end coupled to the first node, a control end receiving the corresponding storage control signal and a second end coupled to a corresponding transmission circuit, and each of the N storages further includes a charge storage element coupled to the second end of the storage switch for storing the charge from the photo sensor.

11. The image sensor of claim 8, wherein each of the at least one transmission circuit includes:
   a transmission switch coupled to one of the N storages, and having a control end receiving the transmission control signal corresponding to the transmission switch; and
   a reset switch coupled to a reset power supply, and having a control end receiving a reset control signal.

12. The image sensor of claim 8, wherein each of the at least one transmission circuit includes:
   a transmission switch coupled to one of the N storages, and having a control end receiving the transmission control signal corresponding to the transmission switch;
   wherein each of the pixel units further includes:
   a reset switch coupled to a reset power supply, and having a control end receiving a reset control signal.

13. The image sensor of claim 8, wherein each of the pixel units further includes:
   a reset switch coupled to a reset power supply, and having a control end receiving a reset control signal.

14. The image sensor of claim 8, wherein when the pixel array circuit performs an exposure operation, the photo sensor of each of the pixel units is simultaneously exposed.

* * * * *